UNITED STATES PATENT OFFICE.

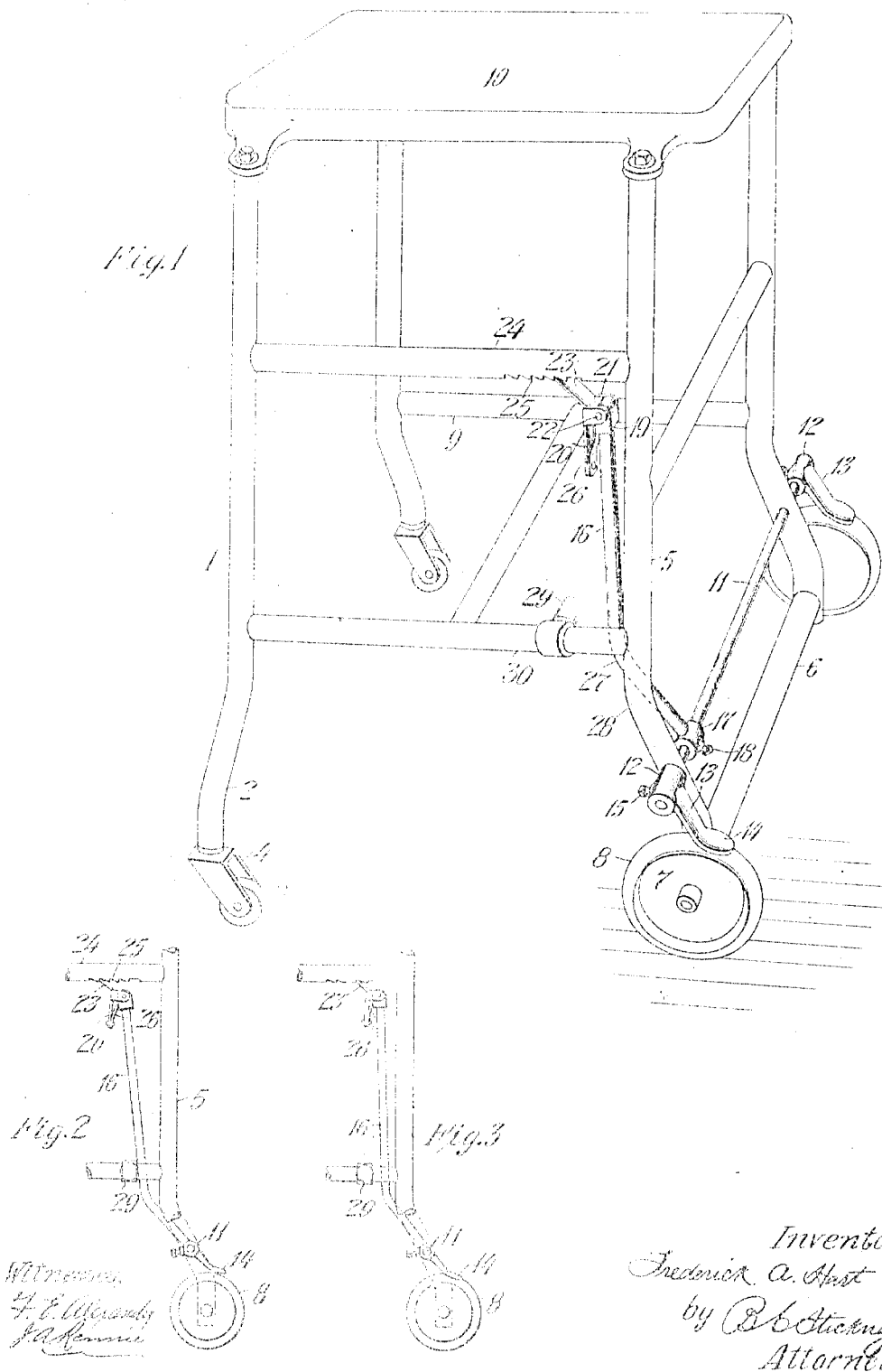

FREDERICK A. HART, OF HARTFORD, CONNECTICUT, ASSIGNOR TO JOHN T. UNDERWOOD, OF BROOKLYN, NEW YORK.

STAND FOR TYPE-WRITING MACHINES.

1,063,878.  Specification of Letters Patent.  Patented June 3, 1913.

Application filed January 25, 1911. Serial No. 604,507.

*To all whom it may concern:*

Be it known that I, FREDERICK A. HART, a citizen of the United States, residing in Hartford, in the county of Hartford and State of Connecticut, have invented certain new and useful Improvements in Stands for Type-Writing Machines, of which the following is a specification.

This invention relates to a movable stand or table such as may be used to support a typewriting or adding machine, or for a similar purpose. These stands are usually mounted upon rollers or wheels, and when the machine is being operated, they have a tendency to roll away from the operator or to change their positions.

The object of this invention is to produce simple means for holding the stand against such erratic movements.

In the accompanying drawings, Figure 1 is a perspective of a stand, showing my invention applied thereto. Fig. 2 is a side elevation, showing the lower portion of the stand at the point where my brake device is applied, certain parts being broken away, and others being shown in dotted outline. This view shows the brake device open, so as to permit the free movement of the stand. Fig. 3 is a view similar to Fig. 2, but showing the brake shoes applied to a wheel.

1 represents a frame of any suitable construction having forward legs 2 with rollers 3 which may be mounted in casters 4, as shown. The rear legs 5 are connected near their lower ends by a horizontal foot brace 6, and in axial alinement with this brace, transportation wheels 7 are attached, said wheels preferably having rubber tires 8, as shown. The legs 4 and 5 are connected by suitable braces, such as the brace 9, and the stand supports a suitable slab or cover plate 10 upon which the typewriting machine or other article may rest.

I provide a horizontal rock shaft 11, the ends of which are mounted in the legs 5, preferably near the brace 6, and the ends of this rock shaft project from the legs, so as to receive the hubs 12 or brakes or braking arms 13, said braking arms inclining downwardly toward the wheels 7, and terminating in enlargements or shoes 14, to rest upon the face of the tires 8 in the manner indicated.

The hubs 12 may be secured rigidly and adjustably to the rock shaft 11 by means of suitable set screws 15; whereby the brakes may be adjusted relatively to each other until they bear equally upon the wheels. At a suitable point near one of the legs 5, an adjustable lever 16 is attached to the rock shaft 11, being provided with a hub 17 having a set screw 18 which enables the lever to be adjusted with respect to the rock shaft.

The upper end of the lever 16 is formed with an enlargement or head 19, having flat side faces, as shown, for the attachment of a locking plate 20. This locking plate is formed with ears 21 attached by a pivot pin 22 on the flat faces of the head 19. The body of this plate is disposed in a substantially vertical position, and the upper end of the plate is bent laterally in an inclined direction, so as to form a pawl or dog 23, the end of which lies adjacent to the under side of a horizontal brace 24, which connects one of the legs 1 with the adjacent leg 5. The under side of this brace 24 is formed with inclined rack teeth 25, which project toward the lever 16 and form a ratchet coöperating with the pawl or dog 23. The dog or pawl 23 is normally held in engagement with the teeth by means of a leaf spring 26, the lower end of which is attached to the lower end of the body of the plate 20 on the inner side thereof, adjacent to the lever; and the upper portion of this spring presses against the side of head 19, as indicated.

In order that the ratchet 25 may be formed near the leg 5 which lies adjacent to the lever 16, the lever is preferably formed with a bend 27, as indicated, and this bend is also desirable on account of a corresponding bend 28 which is formed in the leg 5.

In the construction described, it will be evident that if the lever 16 is moved toward the right, the brake arms 13 will be rotated down toward the wheels, and in such a way that they will apply the brake shoes 14 to both wheels 7. As the lever swings in this way, the dog 23 will slip over the ratchet teeth, and the ratchet teeth will lock the lever against return. In this way, the brakes of the wheels can be locked in their applied position. The brakes may, of course, be released instantly by pressing the plate 20 toward the right, so as to disengage the pawl or dog 23 from the ratchet teeth. The mode of operation of the device is clearly illustrated in Figs. 2 and 3.

In order to limit the releasing movement of the lever 16, I provide a stop 29 which is attached to an adjacent brace 30, so as to project inwardly into the path of the lever. This stop 29 may be covered with rubber or similar material adapted to form a good cushion to prevent a jar in case the lever strikes it with considerable force. On account of the fact that the tires 8 are of rubber, they will exert considerable friction on the floor if they have been locked by the brakes, and this tends to hold the table or stand fixed, and so that considerable force will be required to move it.

The weight of the lever 16 overbalances the brake arms 13, so that the lever naturally tends to release the brakes. On this account the rack 25 suffices to hold the brakes in their unapplied position as well as in their applied position.

Attention is called to Fig. 1, showing that the lever 16 is surrounded by the frame of the table, and it will be seen that the lever does not project from the table so as to be in the way.

Having thus described my invention, I claim:

1. A braced four-legged table, a shaft carrying wheels passing through a pair of said legs near their bottom, another shaft carrying brakes and a brake-lever, mounted above and near to said wheel-carrying shaft, the brake-lever being parallel to and near to one of the legs of said pair, said lever being so arranged as to normally hold, by its weight, the brakes off the wheels, and terminating at its upper end, near a table brace, a ratchet on the under side of said brace and a spring-pressed pawl on the end of said lever for engagement with said ratchet, whereby to press the brakes against the wheels, substantially as described.

2. A braced four-legged table, a shaft carrying wheels passing through a pair of legs near their bottom, another shaft carrying brakes and a brake-lever, mounted in said legs parallel and near to said wheel-carrying shaft, the brake-lever being parallel to and near to one of the legs of said pair, said lever being so arranged as to hold normally by its weight, the brakes off the wheels, and terminating at its upper end, near a table-brace, said brace being arranged substantially at right angles to the plane of the wheel and brake-shafts, a ratchet on the under-side of said brace and a spring-pressed pawl on the side of said lever away from the brakes, for engagement with said ratchet, substantially as described.

FREDERICK A. HART.

Witnesses:
K. FRANKFORT,
PAUL ZIRON.